July 19, 1966 D. LEBELL 3,262,098

PATTERN DATA CONVERTER EMPLOYING BANDWIDTH FILTERS

Filed March 1, 1960 8 Sheets-Sheet 1

INVENTOR
Don Lebell
By Smyth, Roston & Pavitt
Attorneys.

PATTERN DATA CONVERTER EMPLOYING BANDWIDTH FILTERS

INVENTOR:
Don Lebell
By Smyth, Roston & Pavitt
Attorneys.

PATTERN DATA CONVERTER EMPLOYING BANDWIDTH FILTERS

Filed March 1, 1960 8 Sheets-Sheet 3

INVENTOR:
Don Lebell

By Smyth, Roston & Pavitt
Attorneys.

PATTERN DATA CONVERTER EMPLOYING BANDWIDTH FILTERS

INVENTOR:
Don Lebell
By Smyth, Roston & Pavitt
Attorneys.

July 19, 1966 D. LEBELL 3,262,098

PATTERN DATA CONVERTER EMPLOYING BANDWIDTH FILTERS

Filed March 1, 1960 8 Sheets-Sheet 5

INVENTOR:
Don Lebell
By Smyth, Roston & Pavitt
Attorneys

PATTERN DATA CONVERTER EMPLOYING BANDWIDTH FILTERS

Filed March 1, 1960 8 Sheets-Sheet 6

INVENTOR:
Don Lebell
By Smyth, Roston & Pavitt
Attorneys.

PATTERN DATA CONVERTER EMPLOYING BANDWIDTH FILTERS

Filed March 1, 1960 8 Sheets-Sheet 7

INVENTOR:
Don Lebell
By Smyth, Roston & Pavitt
Attorneys

PATTERN DATA CONVERTER EMPLOYING BANDWIDTH FILTERS

INVENTOR:
Don Lebell

By Smyth, Roston & Pavitt

Attorneys.

United States Patent Office 3,262,098
Patented July 19, 1966

3,262,098

PATTERN DATA CONVERTER EMPLOYING BANDWIDTH FILTERS

Don Lebell, Sherman Oaks, Calif., assignor to Don Lebell Associates, Sherman Oaks, Calif., a corporation of California Filed Mar. 1, 1960, Ser. No. 12,137
25 Claims. (Cl. 340—146.3)

This invention relates to a data converter and, more particularly, to apparatus for converting information in the form of a pattern or multivariable symbol to electrical signals suitable for data processing and requiring a minimum bandwidth. The information may be in the form of visible information such as printed text, maps, fingerprint pattern, etc., or other patterns such as speech, radar signals, sonar signals, etc.

In reading apparatus such as utilized in facsimile transmission systems, the input information is converted to analog electrical signals. After transmission and processing the signals are distorted so that often the intelligence is lost. In computer systems having an analog input, the input may be converted to digital form for processing and transmission by digital equipment. In such systems, however, the analog input indicates merely a varying magnitude representing a physical quantity. When the input is in the form of a visible pattern recognizable as representing a particular symbol to an individual, the conversion to digital form is not readily accomplished. The conversion is not readily accomplished because it is actually a range of patterns which represent a particular piece of information. The letter "W," for example, may be represented by different print types and sizes but to the individual reading the letter, the intelligence is the same; namely, that the visible pattern or multivariable symbol represents a particular letter "W" of the alphabet.

In a specific illustrative embodiment of this invention, input information in the form of a multivariable symbol is converted to digital signals representing the information. By multivariable is meant multidimensional variation with time. The present invention is an improvement of the data converter disclosed in my copending patent application Serial No. 832,528, filed on August 10, 1959, and now Patent No. 3,059,064. In the copending patent application, a converter is disclosed for converting printed text to speech and for converting printed text to word addresses in the form of rotary shaft positions. The components of the converter, which include a number of concentric cylindrical members, must be very accurately positioned and moved relative to each other. Small misalignments in the order of 0.001 inch may destroy the accuracy of conversion. Moreover, a relatively high signal-to-noise ratio is required to recognize and translate the input pattern.

In the specific illustrative embodiment of this invention, a converter is provided, including a television camera, for scanning the printed text character by character or symbol by symbol. The camera may either be a black and white television camera or color television camera. The video signals from the camera are converted by a code converter to digital signals representing characteristics of the character or symbol. The digital signals are introduced to a repeater memory which controls the operation of a multiple image display tube. The display tube provides an image of the digital signals repeated many times, illustratively 2,000 times. A phosphor photosensitive translucent memory is positioned over the face of the image tube so that the repeated images of the digital signals appear simultaneously on the translucent memory.

The converter also includes an optical filter dictionary movably positioned adjacent the phosphor memory. The dictionary includes a number of optical filters, one for each character and symbol in the dictionary of characters to be identified. The dictionary can readily be changed for reading a different text. The filter is positioned adjacent to the phosphor memory so that the successive images of the character on the memory are coupled to the different filters in the dictionary. The magnitude of the light through each of the filters, accordingly, depends upon the optical match between the respective filters and the repeated character image on the phosphor memory.

Features of this invention pertain to provision of means for accurately determining which optical filter best matches the repeated image without requiring accurate alignments between the various components, including the image tube, phosphor memory and dictionary. In other words there is no need to accurately position the dictionary and the various filters of the dictionary with respect to the image tube. This is especially important when the dictionary is to be replaceable. Further features of this invention relate to the provision of means for recognizing the input pattern when there are irregularities in the input pattern. Both misalignments and pattern irregularities are forms of noise and means are provided for recognizing a signal representing the pattern in the presence of considerable noise. The means includes apparatus for multiple scanning the various filters of the optical dictionary.

A movable scan member is provided adjacent the optical dictionary having a number of scanning slits respectively associated with the optical filters of the dictionary for sequentially passing the illumination coupled through the optical filters. Each of the filters transmits illumination from a number of the repeated images on the phosphor memory, not just one, and the associated scanning slit functions to scan each of the repeated images during slightly different scan intervals. The scanning slits are angularly oriented with respect to the direction of motion of the scan member so that the different portions of each optical filter perpendicular to the direction of motion are scanned slightly out of phase.

The scanning slits are moved at rapid speed across the optical filter and, at the same time, the optical dictionary is moved through a relatively small distance in the same direction. At one particular position of the dictionary, one of the repeated images to each optical filter will provide a maximum illumination through the optical filter and through one particular point in the associated scanning slit of the scan member. The intensity of the illumination provided through each of the scanning slits, in this manner, varies sequentially during the movement of the scan member to reach a maximum value somewhere along the middle of the scanning movement. The particular shape of a curve illustrating the variation of illumination intensity with time depends upon the match of the respective optical filter with the repeated image provided by the image tube. In this manner, a multiple scan of each of the optical filters is provided. The resulting variation of illumination represents cumulatively the multiple scan or the simultaneous cross-correlation of the input two-dimensional patterns. By utilizing the multiple scan or cross-correlation, a signal representing the input pattern may be developed which is readily detectable even in the presence of considerable noise such as due to irregularities in the input pattern or misalignment of components.

The light through the scanning slits is provided to a second translucent phosphor memory which is scanned by a second television camera. The beam of the second camera is de-focused so as to have a long dimension in one direction such as its width and thin or short dimension in the other such as its height. The beam sweeps across the second phosphor memory with the beam width being of substantially the same length as the corresponding dimension of the image provided by each scanning slit on the phosphor memory. The video signals from the second camera are, accordingly, signals which vary in magnitude in accordance with the variation of illumination intensity provided through the scanning slits of the scan member. The video signals are differentiated and the differentiated signals are indicative of the shape of the video signals and the match of the various optical filters of the dictionary with the repeated image provided by the image tube.

Further features of this invention relate to the provision of means for determining the character address of the maximum value signal from the differentiating means. In the event two optical filters provide for substantially similar magnitudes, a logic circuit is provided for selecting the more probable character. The identity of the character is provided in the form of digital signals which may, illustratively, be binary digital signals.

Still further features of this invention pertain to the provisions of means for automatically adjusting the dimension of the space scanned to read a character in accordance with the size of the character to be read so that different size characters may be read.

Further advantages and features of this invention will become apparent upon consideration of the following description when read in conjunction with the drawing wherein:

FIGURES 1, 2 and 3, with FIGURE 2 positioned to the right of FIGURE 1 and FIGURE 3 positioned to the right of FIGURE 2, are a functional representation of one specific embodiment of the data converter of this invention;

Figure 1:
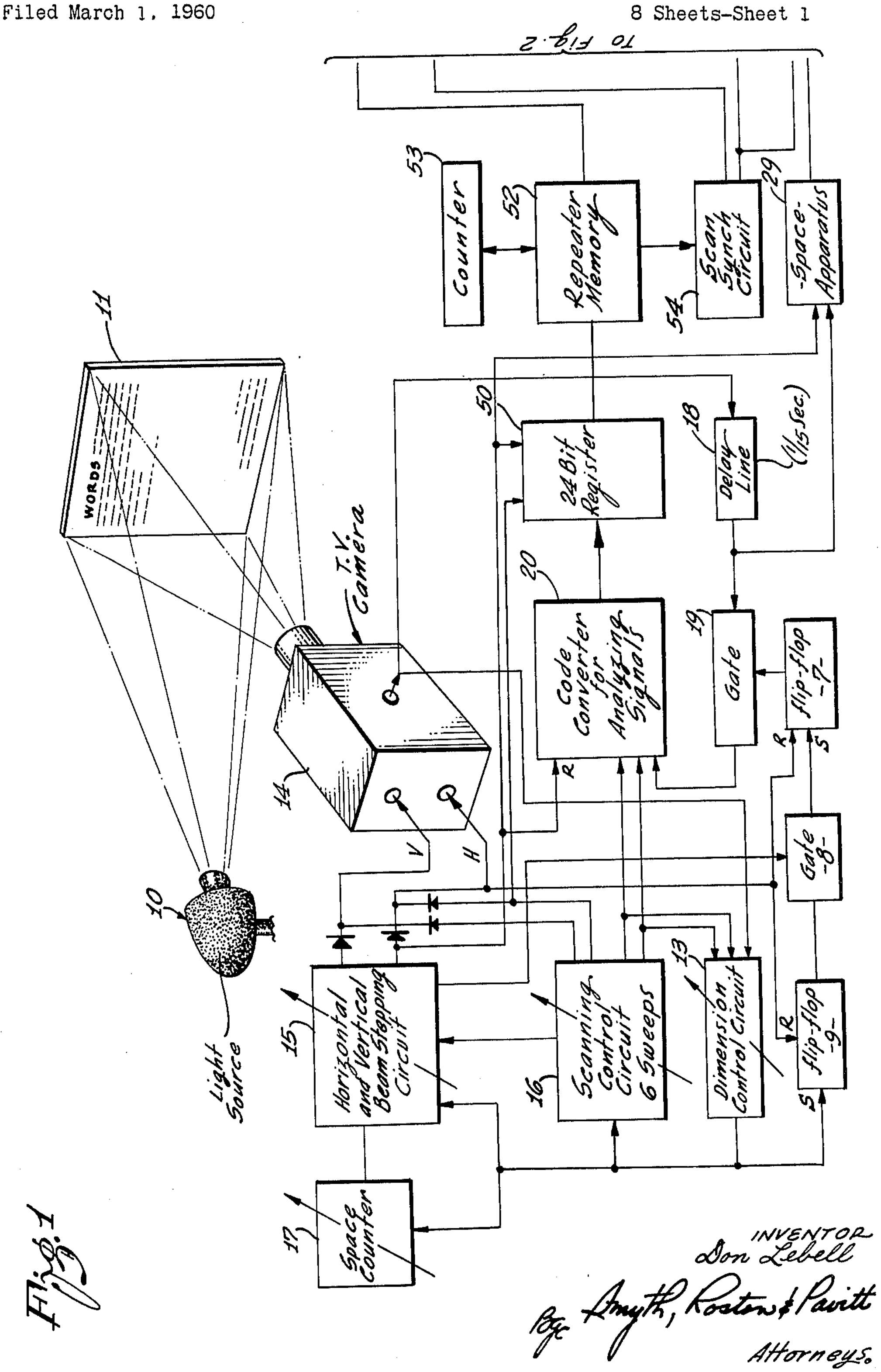
Figure 2:
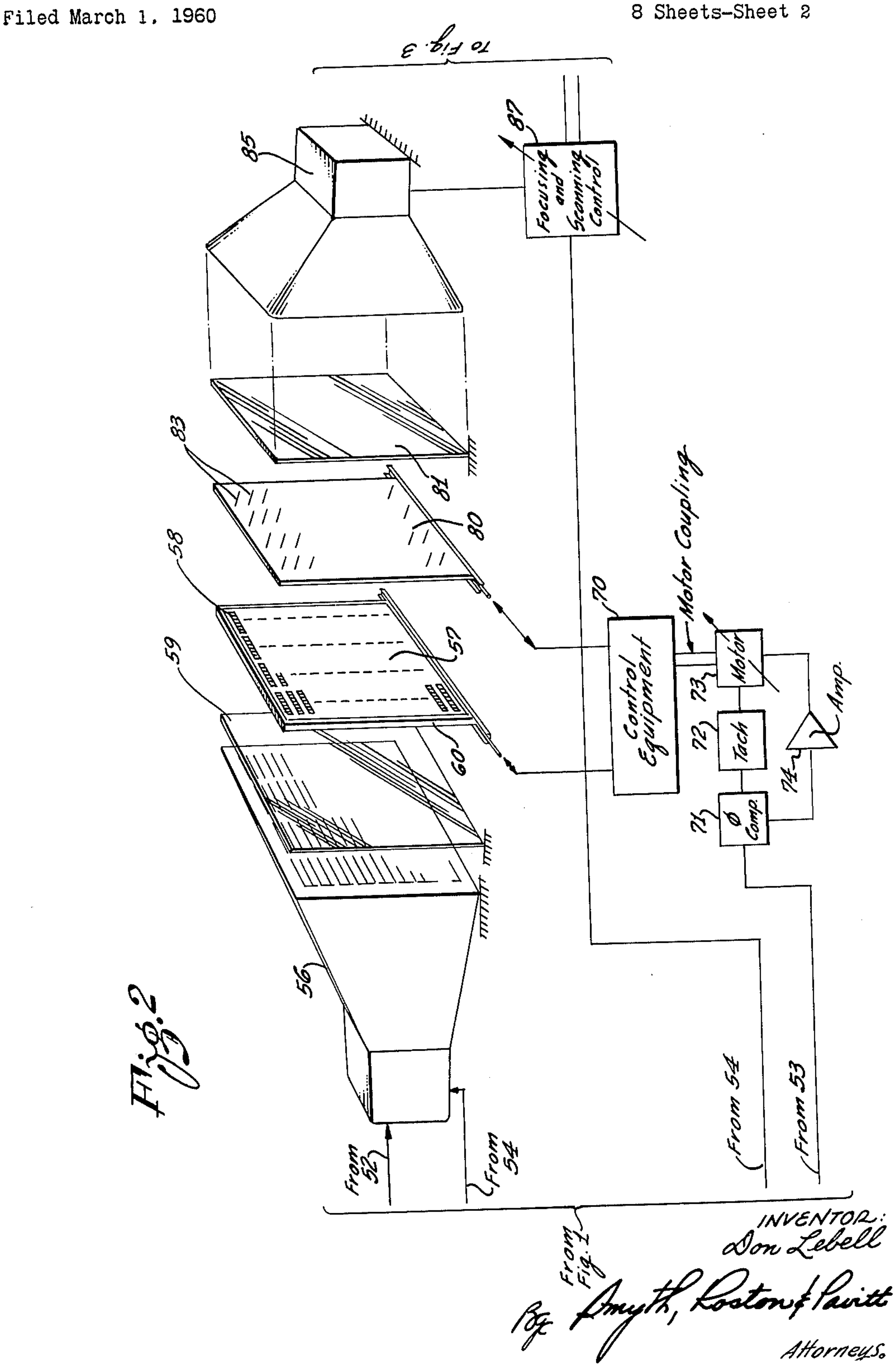
Figure 3:
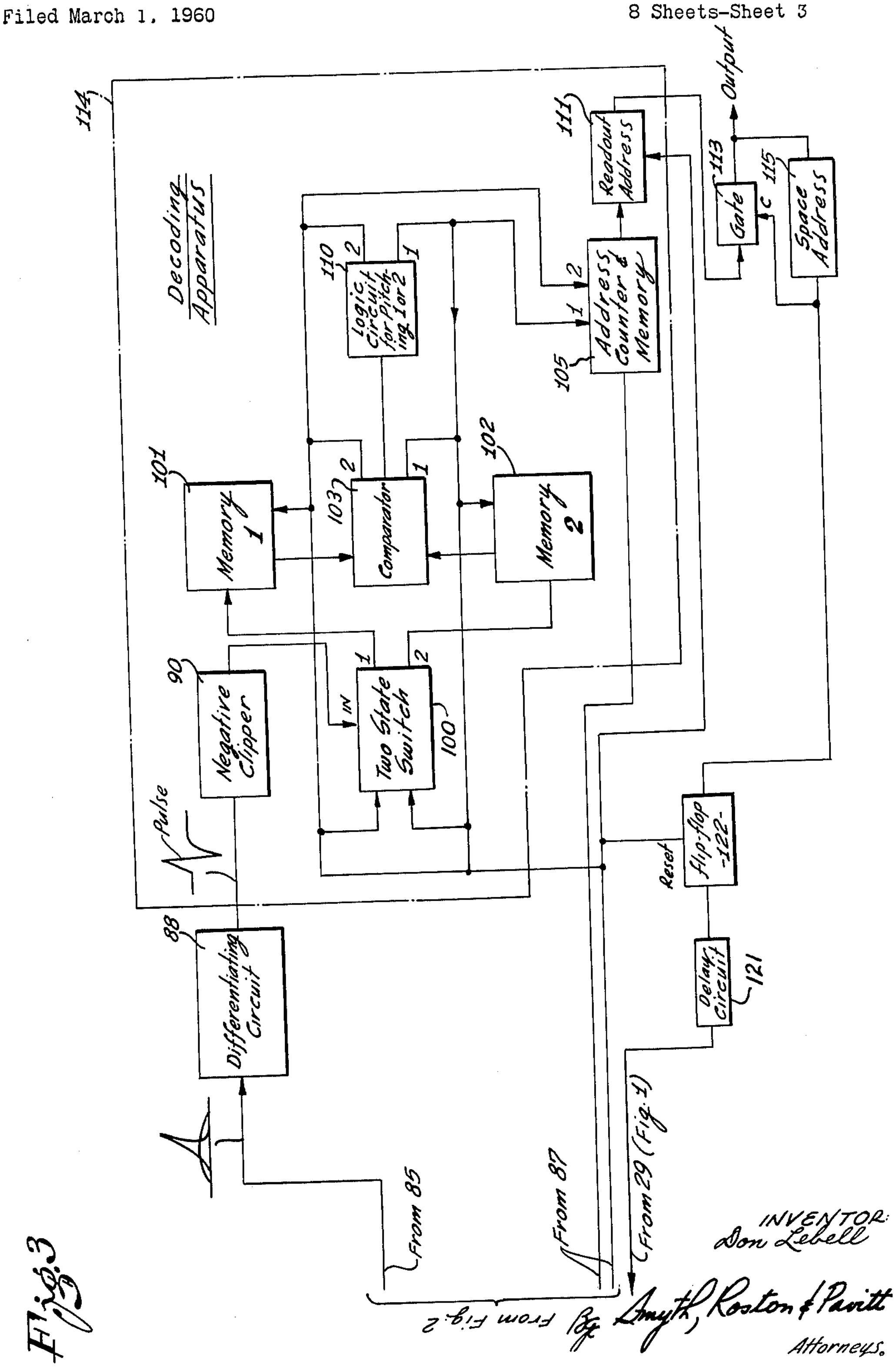

Referring first to FIGURES 1, 2 and 3, with FIGURE 2 at the right of FIGURE 1 and FIGURE 3 to the right of FIGURE 2, a light source 10 projects white light on a page 11 of printed text to be read by the data converter of this invention. Though the illustrative embodiment of this invention is described in reference to a printed text, including typed or printed characters, the principles of the invention are applicable for reading any type of visible information. The visible information, for example, may be in the form of maps or fingerprints or drawings, etc. Moreover, the principles of this invention are applicable to the conversion of any type of signals representing particular patterns. For example, the input signals may be in the form of speech which is converted to electrical signals for introduction to the data converter of this invention. The data converter, accordingly, may be utilized in conjunction with any predetermined two-dimensional patterns. The letter "W," for example, is represented by a number of different visible patterns all of which are readily identified as being the letter "W." The letter may be printed or typed as a number of different configurations, all of which fall in the pattern and are, accordingly, recognized as the letter "W."

The characters on the printed page or text 11 are read one at a time by a television or vidicon camera 14. The vidicon camera 14 may be a monochrome television camera which is conventional except for its scanning program, as is hereinafter described. The present invention is not restricted to the utilization of white light for providing the input to the data converter as colored light and a color camera may be utilized as well.

The vidicon camera 14 is controlled by a beam stepping circuit 15 and by a scanning control circuit 16, both of which are adjustable. The stepping circuit 15 is set initially in accordance with the horizontal dimensions of the spaces allotted in the printed text 11 for the smallest characters and symbols utilized in the printed text. The circuit 15 is also set in accordance with the vertical spacing between the successive lines of the printed text. The scanning circuit 16 is adjusted in accordance with the height and width of the spaces allotted for the smallest characters and symbols in the particular text which is being read by the data converter.

The stepping circuit 15 and the scanning control circuit 16 are automatically adjusted if the character being read is larger than determined by the initial manual settings of the circuits 15 and 16. As is hereinafter described, the video signals from the camera 14 are monitored by a dimension control circuit 13 and if the signals indicate a larger character size than provided for by the manual settings of the circuits 15 and 16, the control circuit 13 adjusts the circuits 15 and 16 for scanning a larger space. The stepping circuit 15 is adjusted to increase the distance of the horizontal step, and the circuit 16 is adjusted to increase the length of the horizontal scans and the distances between successive horizontal scans.

Figure 5:
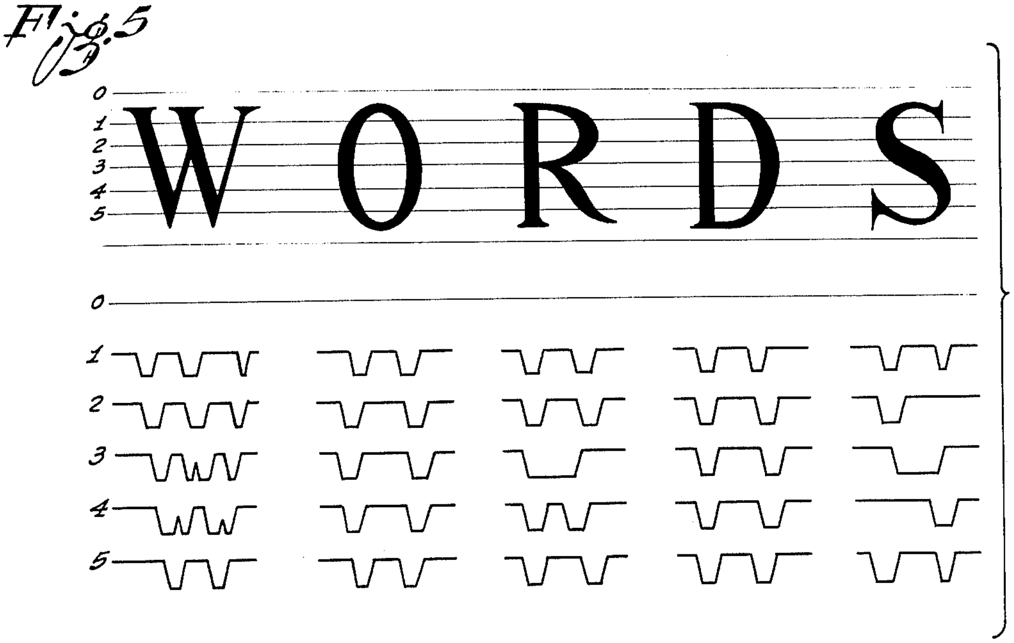
FIGURE 5 is a series of curves illustrating the modulation of the successive line scans of the television camera utilized in the data converter of this invention by a number of characters in the printed text.

The scanning program provided by the stepping circuit 15 and the scanning controlling circuit 16 is initiated when the stepping circuit 15 steps the beam horizontally to initiate a character scan at the upper left hand corner of a character space. The character space is thereupon scanned in six horizontal scans under control of the scanning control circuit 16. The utilization of six horizontal scans is illustrative as any number more or less may be utilized. FIGURE 5 illustrates the six scans 0 through 5 for the five characters W O R D S forming one word of the printed text 11 and the signals produced by each scan. During the scan 0, no portion of any of the five letters is scanned. This scan is utilized to detect the upper portion of such letters as the letter b or h which may extend somewhat higher than those illustrated in FIGURE 5. Each of the succeedings scans 1 through 5 provides for different video signals from the vidicon camera 14. Each character, in this manner, provides for six horizontal line scans of video signals which identify the character.

At the end of a predetermined number of character spaces, the beam in the vidicon camera 14 is stepped vertically to the next horizontal printed line and moved to the left for initiating a scanning sequence for the next printed line. An adjustable space counter 17 coupled to the stepping circuit 15 counts the number of character spaces scanned by the vidicon camera 14 and operates the stepping circuit 15 at the end of a predetermined number, illustratively, 70. The space counter 17 also keeps track of the number of printed lines on a page and at the end of a predetermined number, halts the scanning sequence. Illustratively, a printed page may include 40 printed lines.

The scanning control circuit 16 is synchronized with the beam stepping circuit 15 so that the scanning sequence of a character space is initiated at the upper left hand corner of the character space. The six short horizontal lines of video signals representing a character are successively introduced from the vidicon camera 14 to the dimension control circuit 13 and to a delay line 18.

When the control circuit 13 detects a larger character space, it performs the following functions:

(1) It adjusts the control circuit 16 to increase the distance of the horizontal scans and the distance between scans;

(2) It inhibits the circuit 15 from stepping to the next character space so that the same character space, somewhat enlarged by the circuit 16, is scanned;

(3) It adjusts the stepping circuit 15 to increase the distance of the horizontal step after the repeated character scan in accordance with the increased horizontal dimension of the character space scanned under control of the circuit 16;

(4) It operates the space counter 17 to subtract a space count because the same space is scanned twice; and (5) It operates a flip-flop circuit 9 to obtain the disabling of a gate 19 through the operation of a flip-flop circuit 7 and inhibit the conversion of the video signals produced by the character scan to a digital code.

Figure 11:
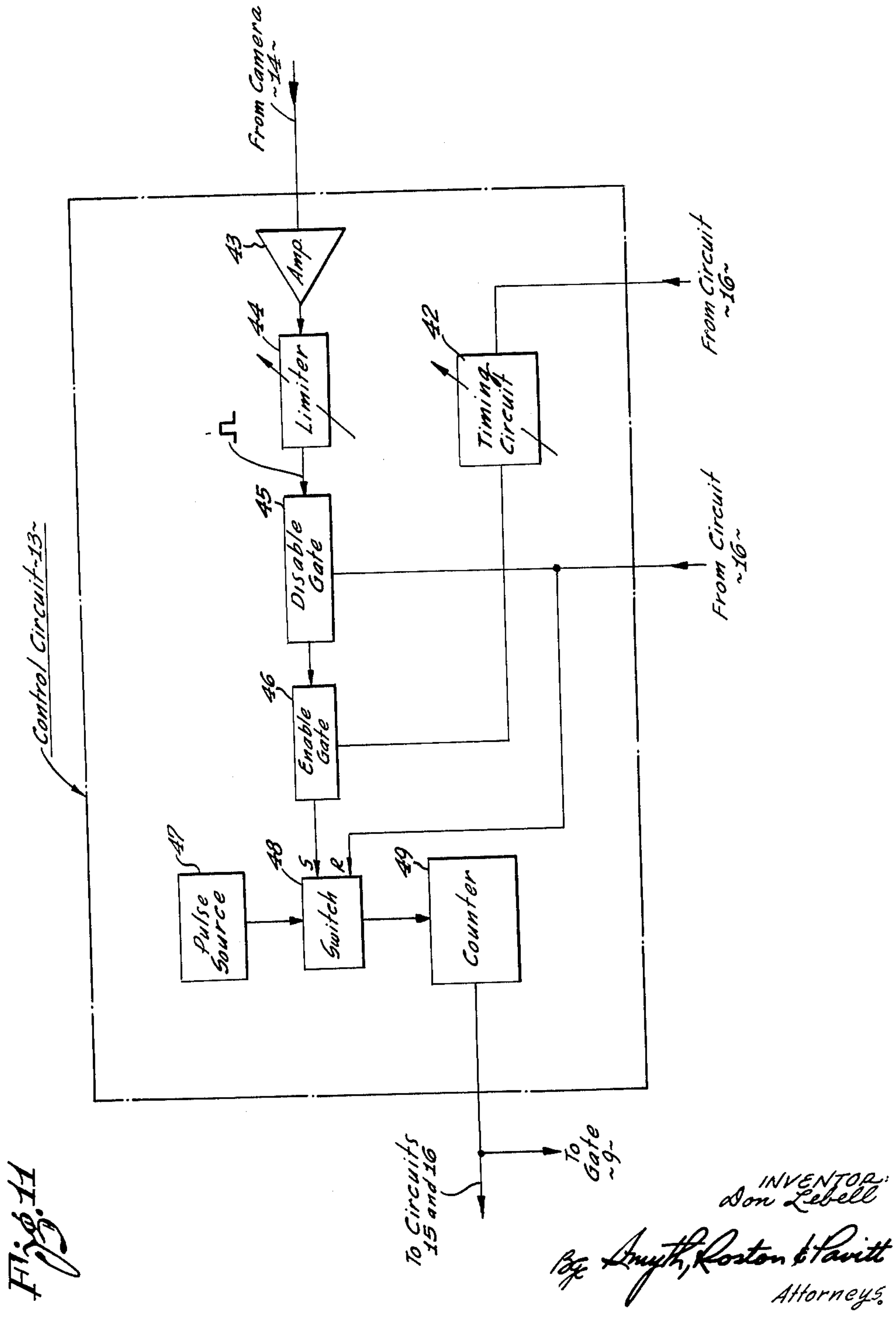
FIGURE 11 is a functional representation of a dimension control circuit utilized in the data converter of this invention.

Referring to FIGURE 11, which illustrates the function details of the dimension control circuit 13, the video signals from the vidicon camera 14 are provided through a video amplifier 43 to an adjustable limiter 44 in the circuit 13. The video signals corresponding to the printed or black portions of the character space provide for a signal from the limiter 44. The pulses from the limiter 44 are introduced to a gate 45 which is normally enabled. The pulses from the limiter 44, accordingly, pass through the gate 45 to a gate 46 which is normally disabled. The gate 46 is controlled by an adjustable timing circuit 42, in turn controlled by the scanning control circuit 16. At the beginning of each line scan, a pulse is provided from the circuit 16 to initiate a timing operation by the circuit 42. At the end of the predetermined time interval determined by the circuit 42, the gate 46 is enabled. The gate 46 remains enabled until the timing circuit 42 resets to re-initiate the timing operation at the beginning of the next horizontal line scan.

The gate 45 which also forms part of the series arrangement from the limiter 44, is disabled at the end of the horizontal line scan by the control circuit 16. The two gates 45 and 46 are, accordingly, both enabled only during a brief interval toward the end of each line scan as determined by the timing circuit 42. The timing circuit 42, which is adjustable, is set when the circuits 15 and 16 are set before the reading operation is initiated in accormdance with the minimum size of the characters to be read.

The larger the minimum size of the characters to be read, the longer the predetermined timing interval provided by the circuit 42. If a pulse is provided from the limiter 44 during the brief interval at the end of a horizontal line scan during which both gates 45 and 46 are enabled, the pulse from the limiter 44 is introduced to set a switch 48. The switch 48 is coupled between a pulse source 47 and a counter 49. The switch 48 remains set until reset by the end of the line scan pulse from the control circuit 16 to enable the passage of the pulses from the source 47. The counter 49, in this manner, counts the pulses from the source 47 providing an indication of the duration from the initiation of the pulse until the end of the line scan. The shorter this interval, the larger is the character being scanned on the page 11 because a pulse is provided by the limiter 44 closer toward the end of the horizontal line scan. The output of the counter 49 is introduced to the control circuits 15 and 16 for automatically adjusting them to increase the dimension of the character space timing scan. The horizontal line scan is increased in accordance with the signal from the counter 49 and the distance between the line scans are also increased. The stepping circuit 15 is adjusted so as to repeat the character scan and then to step through a larger distance for reading the next character.

After the character scan has been repeated, the circuits 15 and 16 automatically return to normal so that succeeding character scans are again as determined by the initial manual settings. Each larger character, accordingly, requires a double scan.

As described above, when the larger character is detected by the control circuit 13, the flip-flop circuit 77 is set as a result of the passage of a signal through the gate 8 from the flip-flop circuit 9. When the flip-flop circuit 7 is set, it disables a gate 19. The gate 19 is connected between the delay line 18, to which the video signals are introduced, and a code converter 20. As is hereinafter described, the code converter 20 analyzes the video signals and provides digital signals representing the pattern indicated by the video signals. The delay line 18 provides for a delay equal to the duration for scanning a character. Illustratively, the character scan may have a duration of $1/15$ of a second. During the time, therefore, that the dimension control circuit is checking the dimensions of the character being scanned in each of the six horizontal line scans, the video signals are effectively stored in the delay line 18. If the circuit 13 detects a larger character, the gate 19 blocks the video signals from the delay line 18. The gate 19 remains disabled for the duration of a character scan under control of the flip-flop circuit 9, and a gate 8.

The flip-flop circuits 7 and 9 are reset by signals from the stepping circuit 15. When the flip-flop circuit 7 becomes set, it enables the gate 19 for the passage of signals from the delay line 18. The gate 19 remains enabled until the end of the character scan because it is actually the video signals from the previous character scan which are passing from the delay line 18 to the converter.

The circuit 9 is reset by the stepping circuit 15 to return the gate 19 to the enabled state. The stepping circuit 15 resets the flip-flop circuit 9 and the flip-flop circuit 7 when it steps the camera 14 to the next character space on the printed page 11. The pulse to the gate 8 from the circuit 15 occurs at the end of each character scan whether or not the beam in tube 14 is stepped. The reset pulse to the circuits 9 and 7, however, is provided only when the beam is stepped.

Figure 4:
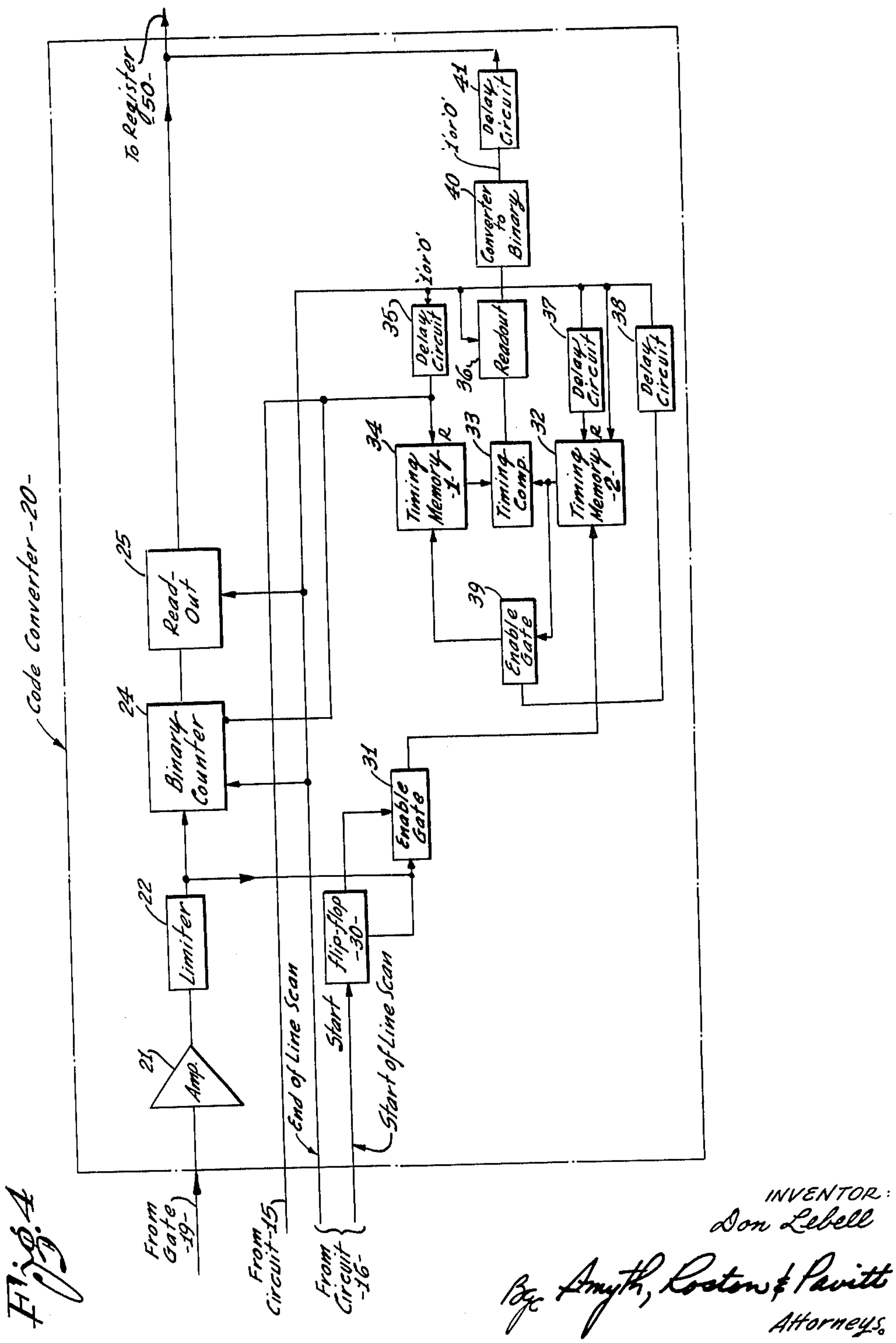
FIGURE 4 is a functional representation of a code converter utilized in the data converter of this invention.

The code converter 20, accordingly, does not receive the video signals developed during the first of two scans of the same character. The video signals from the second scan, after the adjustments of the circuits 15 and 16, are introduced to the code converter 20. The functional details of the code converter 20 are depicted in FIGURE 4. Before, however, proceeding with the description of the details of the converter 20, some of the other components in FIGURE 1 are first briefly described.

The digital signals from the code converter 20, which may be binary and consist of four binary digits or bits for each horizontal scan line are provided in a binary register 50. With four binary digits for each horizontal line and six lines for each character, the register 50 has a capacity of 24 binary digits. When the vidicon camera 14 is stepped horizontally to a character space, the register 50 is operated by the stepping circuit 15 to supply in parallel the 24 binary digits to a repeater memory 52. The register 50 is shifted under control of the scanning control circuit 16 during the operation of the code converter 20 and it resets automatically when the 24 binary digits are read out to the repeater memory 52. The character scan duration is $1/15$ of a second so that 15 letters are scanned, then converted to binary signals and provided to the repeater member 52 during each second. With the scanning rate at 15 letters per second and a typical word consisting of five letters, a scanning rate of 120 words per minute is provided. The scanning rate of 120 words per minute is fairly typical of conventional speech.

The rate of converting the scanned video signals to binary digital signals is reduced when the size of the character changes. When the dimension control circuit 13 detects a character size change, the one-fifteenth of a character scan is repeated so, depending on the number of character size changes, the conversion rate is reduced. Actually, each larger size character requires a repeated scan. For a series of large characters, the scanning rate is effectively halved by the repetition. Actually, however, in the usual text, a larger character only appears infrequently so that the scanning rate is not materially affected.

As described above, the code converter 20 receives the six horizontal line scans for each character and converts them to binary digital signals representing the visible pattern of the character. Referring now to FIGURE 4, which illustrates the functional details of the code converter, the video signals through the delay line 18 and gate 19 from the vidicon camera 14 are coupled through a video amplifier 21 to a limiter 22 in the converter 20. The video signals, which are illustrated in FIGURE 5, are clipped by the limiter 22 so that they have substantially similar amplitudes at the output of the limiter 22. The limited pulse signals are provided from the limiter 22 to a binary counter 24 and also to a gate 31. The binary counter 24 counts the number of pulses appearing in each of the horizontal scan lines. In the line 0 for the character W, as illustrated in FIGURE 5, the count is 0; for the scan line 1, the count is 3 or 011 in binary form, etc.

Figure 6:
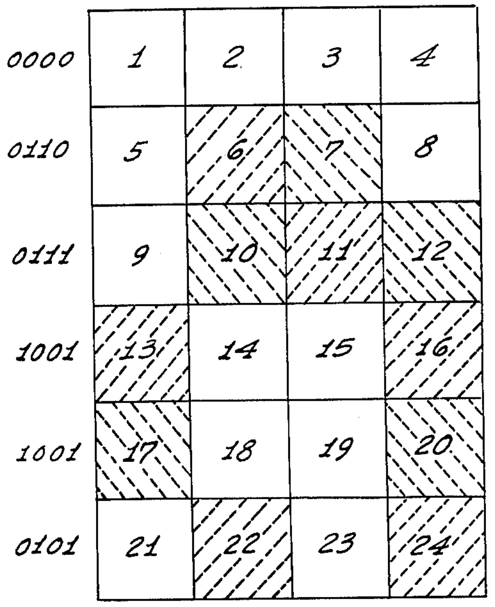
FIGURE 6 is a diagrammatic representation of the coding of the successive line scans of the television camera utilized in the data converter of this invention for the letter "W"

As described above, the video signals for each horizontal line scan are converted to four binary digits representing the characteristics of the portion of the letter or character being scanned. The first three digits are utilized for the count of pulses from the counter 24. In FIGURE 6, the binary coding for the letter "W" is illustrated. For line 0, the first three digits 1, 2 and 3, are 000, and for line 1 the first three digits 5, 6 and 7 are 011 to indicate a count of 3.

The last digit of each four digits for a line is utilized to indicate the slope of the left side of the character being scanned. A 1 digit indicates a negative slope and a 0 digit indicates a positive slope. The slope is determined by the components, including the gate 31 mentioned above, in the lower portion of FIGURE 4. The gate 31 is controlled by a flip-flop circuit 30. At the beginning of each horizontal line scan, the scanning control circuit 16 provides a start pulse to set the flip-flop circuit 30. When the flip-flop circuit 30 is set, it enables the gate 31 coupled to the output of the limiter 22. The flip-flop circuit 30 is set and the gate 31 is enabled before the provision of a pulse by the limiter 22 in the horizontal line scan. The first pulse from the limiter 22 appearing in a horizontal line scan is coupled through the enabled gate 31 to a timing memory circuit 32. The first pulse also resets the flip-flop circuit 30 which, in turn, disables the gate 31. Succeeding pulses from the limiter 22 during the same horizontal line scan are, in this manner, blocked at the gate 31. They are, however as indicated above, provided to the binary counter 24.

At the end of a line scan, the scanning control circuit 16 provides a pulse to read-out circuit 25 which provides the binary digital signals in serial form from the binary counter 24 to the register 50 described above in reference to FIGURE 1. The end of line beam pulse from the circuit 16 also resets the counter 24 and operates a read-out circuit 36. The read-out circuit 36 is coupled to the output of a timing comparator 33 which compares the magnitude of timing potentials in two timing memory circuits 34 and 32. As described above, the timing memory circuit 32 is operated by the first pulse from the limiter 22 during each horizontal line scan of the character.

The potential at the output of the timing circuit 32 increases linearly during its operation. The output potential from the timing circuit 32 is continuously compared by the timing comparator 33 with the output potential of the timing circuit 34. When the read-out circuit 36 is operated, one of two indications are provided from the timing comparator 33 which indicates the relative magnitudes of the output potentials of the two circuits 32 and 34. If the output potential of the timing circuit 32 is larger than or equal to the output potential of the circuit 34, one potential is provided and if the output potential of the circuit 34 is larger, another potential is provided. The output potentials are introduced to a converter 40 which adjusts the levels to that equivalent to the binary signals of the read-out circuits 25. A 1 digital is provided from the converter 40 when the output potential of the memory circuit 32 is larger than or equal to that of the output potential from the timing circuit 34 and a 0 digital signal is provided when the output potential of the memory circuit 32 is less than that of the circuit 34.

The digital signal from the converter 40 is introduced to a delay circuit 41 and therefrom to the register 50. The delay circuit 41 delays the binary digit so that the three binary digits from the read-out circuit 25 are provided first to the register 50 and then the one binary digit from the converter 40 is provided to the register 50.

At the end of the line scan, the pulse which operates the read-out circuit 36 is also provided to three delay circuits 35, 38 and 37 which provide for successively larger delays. The three delay circuits 35, 37 and 38 may be part of a delay line having three different taps. The pulse through the delay circuit 35 functions to reset the timing circuit 34 and the pulse through the delay circuit 37 functions to reset the timing circuit 32. The two timing circuits 34 and 32 are reset after the comparison of the output potentials have been made and converted to a binary indication.

The pulse through the delay circuit 38 is provided after the circuit 34 is reset and before the circuit 32 is reset to enable a gate 39 coupled to the output of the timing circuit 32. With the timing circuit 34 reset, the ouput potential of the timing circuit 32 is introduced through the enabled gate 39 to the timing circuit 34. Thereafter the timing circuit 32 is reset. The pulse provided at the end of the line scan, in this manner, functions to reset the timing circuit 34 and then shift the timing informaion in the timing circuit 32 to the timing circuit 34. The timing circuit 32 halts its timing operation at the same time that the read-out circuit 36 is operated. The output potential from the timing circuit 32 accordingly stops increasing when the comparison is made.

The sequence is repeated, in this manner, in each line with the durations following the first pulse provided in each line to the end of the line being compared for successive lines. If the timing intervals increase from one line to the next, an indication is provided of a negative slope at the left side of the character being scanned. A 1 digit provided from the delay circuit 41 in this manner indicates a negative left stop whereas a 0 digit indicates a positive left slope of the letter.

Figure 7:
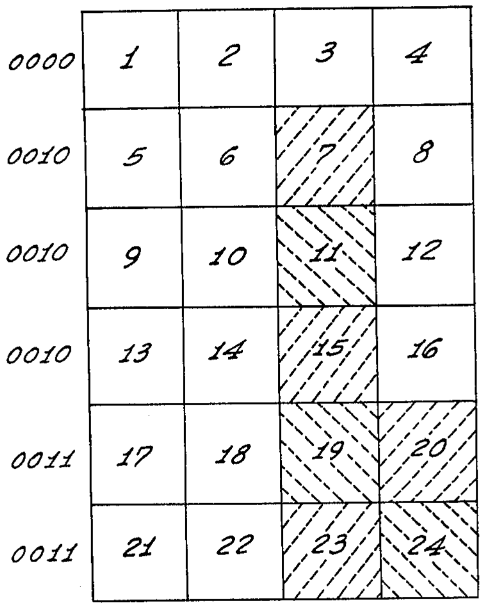
FIGURE 7 is a diagrammatic representation of the coding of the successive line scans of the television camera utilized in the data converter of this invention for the letter "O"

As indicated above the four digital signals provided for each line scan of the characters W and O are illustrated respectively in FIGURES 6 and 7. As shown in FIGURE 5, for 0 scan, no pulses are provided so that the first three digits for the zero scan are 000 as indicated by the lack of shading in boxes 1, 2 and 3 in FIGURE 6. The last digit, or digit 4, of the first scan is always a zero because no comparison is being made. For the second line scan and the fifth through eighth binary digits of the 24 digit number, three pulses are provided from the limiter 22 and the output potential from the timing memory circuit 32 is smaller than that of circuit 34 so that the digits 0110 are provided. For the successive line scans, binary signals are similarly provided. For the successive line scans, binary signals are similarly provided with the first three digits indicating the number of pulses provided by the limiter 22 and the last digit indicating the slope of the left side of the letter. For the letter O, as illustrated by the binary digits 12, 16, 20 and 24 in FIGURE 7, the slope changes from a positive to a negative slope for the last 2 line scans 4 and 5. Each character provides, in this manner, for a 24 digit number indicative of the characteristics of pattern of the particular character being scanned.

When the stepping circuit 15 steps the camera 14, it also provides a reset pulse to the circuit 34 and the counter 24 in the converter 20 to insure that they are ready for the next character conversion. Effectively the pulse from the circuit 15 resynchronizes the code converter 20 for each character.

The present invention is not restricted to the particular code conversion disclosed herein as, for example, as indicated above, more or less than six horizontal line scans may be utilized and other characteristics may be indicated in digital form. For example, the slope of the right side of the character may be analyzed as well as the slope of the left side. Moreover, as indicated above, colored television signals may be utilized as well as monochrome television signals. Instead of a vidicon camera different scanning arrangement could be utilized. For example, the colored light representing the pattern could be provided to different scanning slits having different optical characteristics resulting from different color filters. The slits may also have different shapes to provide for different combinations of signals. The invention is therefore not restricted to the particular scanning arrangement or code conversion.

The 24 digit signals are provided from the code converter 20 to the 24 bit register 50 in FIGURE 1. When the stepping circuit 15 operates to step the beam of the vidicon camera 14, it also operates the register 50 to provide the 24 binary digits to the repeater memory 52. The repeater memory 52 may include a magnetic tape or electronic register which operates at a high speed to reproduce the 24 bit binary digital signals at an illustrative speed of 78,750 repetitions per second. The repeater memory 52 is controlled by a counter 53 associated therewith. The counter 53 counts the number of signal repetitions provided by the memory 52 and halts and resets the memory after a predetermined count. The predetermined count may illustratively be 2625 so that the repeater memory 52 is operated for $\frac{1}{30}$ of a second (78,750 divided by 2625) and then halted and reset.

The repeated digital signals from the memory 52 are introduced to a cathode ray image tube 56 in FIGURE 2 which is synchronously operated with the memory 50 under control of a scan synchronizing circuit 54 in FIGURE 1. The image tube 56 may be a precision tube which is operated in accordance with the conventional television scanning pattern. Line interlaced scanning may be utilized with the frame repetition rate being 30 per second and the field repetition rate being 60 per second. The repeater memory 52 provides the digital signals at a rate of 2625 times for $\frac{1}{30}$ of a second which is the duration of one scanning frame of the image tube 56. During one frame of the image tube 56, therefore, the image is repeated many times on the face of the image tube 56.

The memory 52 and the image tube 56 are synchronized so that the binary signals for the character are repeated illustratively four times during each horizontal line of the tube 56. With 24 binary digits being included for each repetition, the horizontal line includes 96 binary digits. The binary digits for each image are separated horizontally on the face of the image tube 56 by a distance equivalent to two binary digits so that the horizontal line definition must have the ability to provide an image of somewhat more than 96 binary digits. In the conventional television picture, each scanning frame includes 525 horizontal lines or 262½ in each of the two interlaced fields. Only approximately 485 of these lines are visible because of the vertical blanking interval which has a duration equivalent to approximately 45 horizontal lines. During one scanning frame, therefore, approximately 485 times 4 or 1940 repeated images are provided on the face of the image tube 56. Some of the repeated signals provided during the repeater memory 52 occur during the blanking interval and do not provide for an image.

In the conventional television signal the horizontal blanking pulses are allocated approximately 16 percent of the time available for each line. Thus only 84 percent of the 63.5 microseconds for each horizontal line is available for the forward trace during which the repeated images are provided. The 24 bit binary digital signals are accordingly repeated at a rate of 5 times for each horizontal line or 2625 times for each frame. Some of the repetitions occur during horizontal blanking intervals and some during the vertical blanking interval so that approximately only 1940 repeated images (4 for each visible line) are provided.

The repeater memory, accordingly, must operate at approximately 2625 times during $\frac{1}{30}$ of a second or at a speed of 78,750 repeats per second. With approximately 26 binary digits being provided for each repeat (2 for spacing), the repetition rate is 2,037,500 bits per second so that the frequency of the video signals must be at least 2.1 megacycles. Actually, video frequencies range up to four megacycles so that this speed is well within the operating speed of conventional television tubes.

Positioned adjacent the face of the image tube 56 is a translucent phosphor memory member 59. The visible repeated images of the digital signals 4 for each horizontal line are provided sequentially line by line and the memory member 59 functions to register the illumination so that the repeated images can be simultaneously provided to an optical dictionary 57. The memory member 59 may be included as part of the image tube 56 instead of being an external member thereto and retains the images for an illustrative interval of $\frac{1}{15}$ of a second. The optical dictionary 57 is positioned adjacent to the phosphor memory 59 and includes a number of optical filters 58 illustrated in FIGURE 9. Illustratively, the dictionary 57 may include 100 optical filters arranged in a rectangular array with four in each row and 25 in each column. Each of the optical filters 58 is positioned approximately adjacent a number of the repeated images on the translucent phosphor memory member 59. The height of each filter 59 may be approximately ⅓ of an inch and its length may be approximately 2 inches. The particular dimensions of the filters 58 depend upon the size of the image tube 56. For a tube having a face 10 inches by 10 inches the above filter dimensions are suitable. Approximately a vertical dimension of 0.4 inch is allotted for each filter 58 including the interfilter spacing. For a larger image tube, these dimensions can be increased or a larger number of similar size filters may be utilized.

Figures 8, 9:
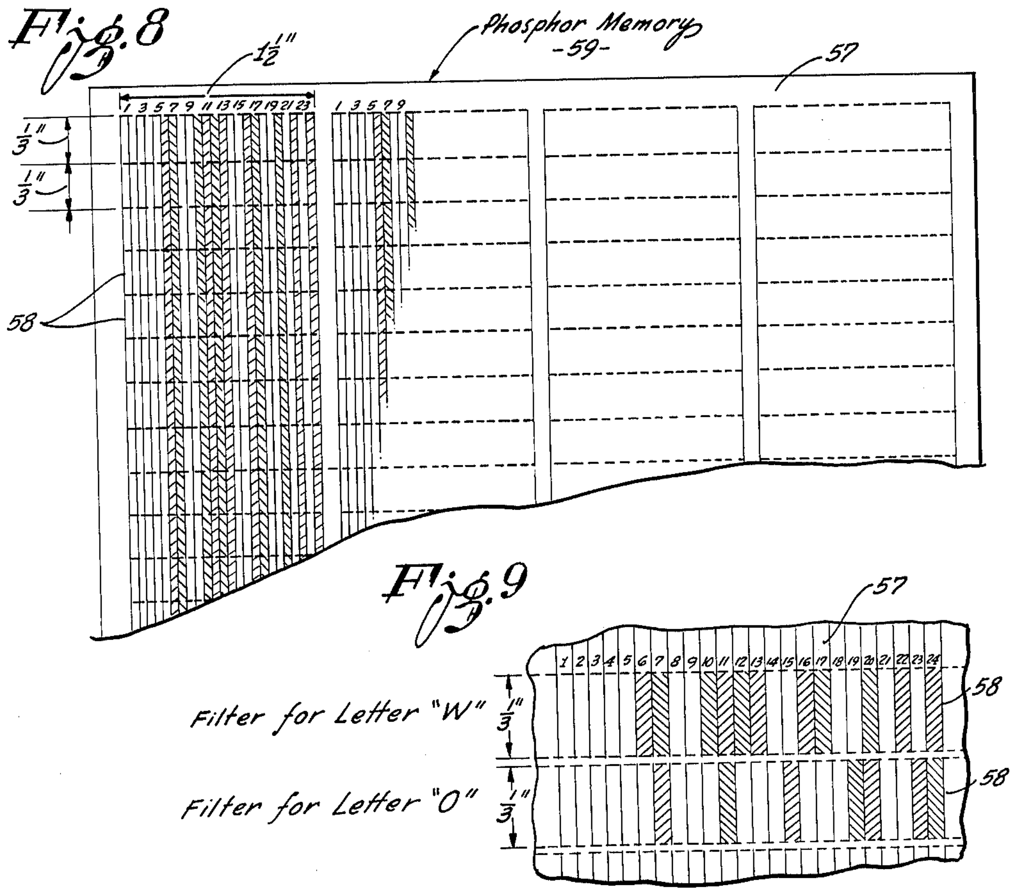
FIGURE 8 is a diagrammatic representation of the phosphor memory adjacent the face of image tube both utilized in the data converter of this invention for one particular character.
FIGURE 9 is an enlarged front view of a portion of the dictionary utilized in the data converter of this invention illustrating the particular filters utilized for the letters "W" and "O"

The face of the image tube 56 and phosphor memory member 59 include approximately 19 of the horizontal line scans in ⅓ of an inch. Each of the horizontal line scans is identical so that actually the binary bits forming the digital signals provide for vertical lines across the face of the image tube 56 and the memory member 59 as illustrated in FIGURE 8. The vertical alignment of the optical filters 58 with respect to the repeated patterns on the memory member 59 is, therefore, not critical. A height of 19 horizontal lines indicates that 19 of the repeated images are provided for each of the optical filters. Some of these images, however, occur between adjacent ones of the optical filters 58 and others approximately 18 are positioned to illuminate the provided optical filter 58.

The horizontal as well as the vertical alignment of the optical filters 58 with respect to the repeated patterns is not critical because, as is hereinafter described, each of the optical filters 58 is scanned sequentially by a scan plate 80 with the sequential sequence being initiated at slightly different intervals. The effect is to scan horizontally each of the optical filters 58 at different vertical positions thereof in and out-of-phase manner. At one particular vertical position of the optical filters, the optical filter 58 may be exactly aligned with one of the 15 repeated images so that a maximum illumination will be provided therethrough. The dictionary 57 is moved at a slow rate over a distance of approximately ¼ of an inch permitting horizontal alignment tolerances of ¼ of an inch. This dimension, however, is merely illustrative as greater alignment tolerances may be readily provided. During the time that the dictionary 57 moves horizontally over ¼ of an inch, the scan disc 80 moves slightly more than 2 inches or a distance greater than the horizontal dimension of the optical filters 58.

Both the dictionary 57 and the scanning plate 80 are moved by control equipment 70. The control equipment 70, which may include cams, not shown, is synchronously operated under control of the circuit 54 described above. As described above, the circuit 54 synchronizes the image tube 56 with the memory 52. At the end of the visible portion of the scanning frame of the image tube 56, a synchronizing pulse is provided to a phase comparator 71 which compares the phase of the synchronized pulse with the phase of a tachometer signal provided by a tachometer 72 attached to an adjustable motor 73. The adjustable motor 73 is controlled by the phase comparator 71 through an amplifier 74 to operate the control equipment 70. The control equipment 70 is accordingly synchronized with the tube 56 and the memory 52. The horizontal movement of dictionary 57 and of the scan plate 80 in the same direction are initiated by the control equipment 70 just after the visible portion of a vertical scanning is completed.

The scan plate 80 includes a number of angularly aligned scanning slits 83, one for each of the optical filters 58 of the dictionary 57. The vertical dimension of each scanning slit 83 is slightly greater than the scanning dimension of the optical filter 58 and its horizontal dimension may be approximately the same as its vertical dimension. The scan plate 80 moves at a more rapid speed than does the dictionary 57 so that the light passing through the lower portion of each filter 58 is first provided through the associated scan slit 83. The movement of both the distionary 57 and the plate 80 is to the right in FIGURE 2. The particular angle of orientation of a scan slit 83 is not critical. By reversing the orientation, the upper portion of the filters 58 are first scanned. The different vertical portions of each of the scan slits 83 scan the different vertical portions of each of the optical filters 58 sequentially out of phase with each other. At one particular position of the dictionary 57 with respect to the phosphor memory member 57, the optical filters 58 will be exactly horizontally aligned with the repeated images on the memory member 59. At that position, in general, a maximum amount of light will be coupled through each of the scan slits 83.

Figure 10:
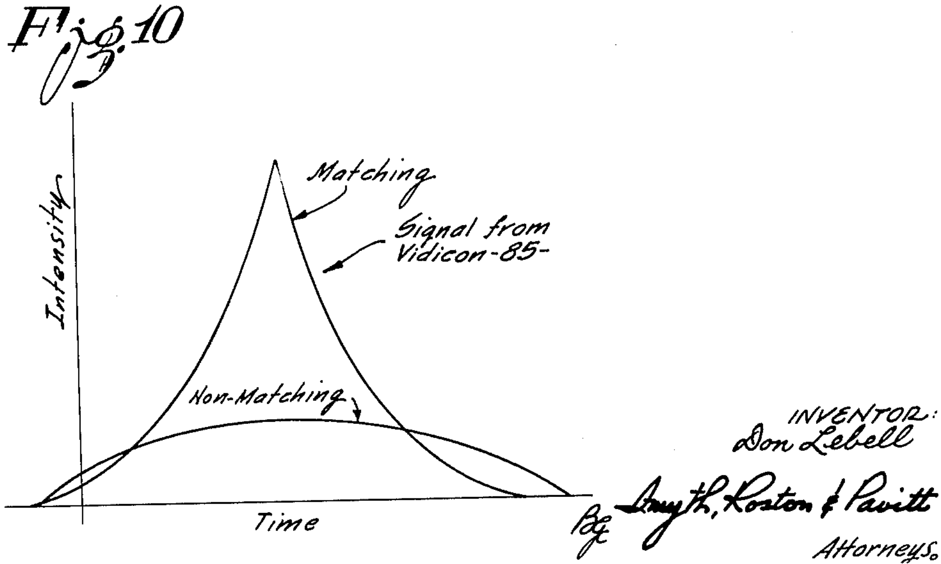
FIGURE 10 is a series of curves illustrating the signals provided from the second television camera utilized in the data converter of this invention.

The 100 optical filters are all different so that one will most closely match the optical characteristics of the repeated image on the memory member 59. FIGURE 9 illustrates the filters 58 for the letters "W" and "O." FIGURE 10 illustrates the illumination intensity curves provided by the optical filter which matches the repeated binary image and by another filter. For the matching filter, the illumination intensity increases quite sharply for the different positions of the scan slit 83 to a maximum point where the optical filter is exactly horizontally aligned with the repeated images on the memory member 59. Thereafter the intensity decreases sharply to provide a sharp peaked response. If the optical characteristics of the filter do not substantially match, a sharp peaked curve of illumination intensity is not provided.

Actually the optical characteristics of the filter do not have to exactly match. The multiple scan provided by the angularly aligned slits 83 provides for a cumulative effect so that the closest matching optical filter 58 is readily selected even if it does not substantially match the light pattern. The multiple scan which is a simultaneous cross-correlation of a two-dimensional pattern provides for the recognition of the light pattern even in the presence of considerable noise. The variation in matching is effectively noise and any irregularities in the input patterns or any misalignment between components of the system results in noise. For example, if a small portion of the letter "W" being read is missing or distorted, the optical filter 58 for W will still provide the largest peaked illumination variation.

The multiple scan in this manner supplements the code converter 20 from the standpoint of recognizing the input pattern. If the pattern is off by a bit, it may still be recognized.

The light sequentially provided through the different portions of each of the slits 83 impinges upon a second translucent memory member 81 which is positioned directly behind the scan plate 80. Each of the scanning slits 83 provides for an angular band of illumination on the memory member 81 with the bands being tilted at an opposite angle to the angle of the scan slits 83 due to the movement of the scan plate 80. The intensity of the bands varies vertically in accordance with the curves depicted in FIGURE 10. The storage time provided by the memory members 59 and 81 may be slightly less than $1/15$ of a second. The bands of illumination registered in the memory member 81 due to the scanning operation by the scan plate 80, accordingly, represent the respective matches between the optical filters 58 or dictionary 57 and the repeated image on the face of the image tube 56.

The memory member 81 is scanned by a television or vidicon camera 85. The scanning beam of the camera 85 is not focused to a point but has a substantial width equal approximately to the horizontal dimension of the illumination bands on the memory member 81. This dimension is slightly smaller than the horizontal dimension of the optical filters 58 due to the movement of the dictionary 57. In other words, the beam of the vidicon camera 85 is a horizontal line approximately 2 inches long. The beam is swept vertically under control of the focusing and scanning control 87 four times during the $1/30$ of a second following the scanning operation of the scan plate 80. The scanning control 87 is synchronized with the scanning synchronizing circuit 54 so that the first vidicon scan is initiated at the same time that a vertical frame is initiated by the image tube 56.

Due to the timing of the various components under control of the repeater memory 52 and the circuit 54, the memory 52 and image tube 56 and associated components operate for $1/30$ of a second and then are not operated again until the next 24 bit character signal is provided from the register 50 to the memory 52. As described above, the 24 bit character signal is provided at a repetition rate of 15 per second. In other words, the image tube 56 is operated for one frame to provide the repeated images and then during the next frame does not provide any image at all. The vidicon camera 85 operates during the second $1/30$ of a second interval when the image tube 56 does not provide the repeated images. The phosphor memory members 59 and 81 have a storage duration slightly less than $1/15$ of a second so that they retain the intelligence for a sufficient interval to provide for the scanning functions.

As the side beam of the vidicon camera 85 sweeps vertically across the illumination bands on the memory member 81, video signals are provided therefrom which indicate the match between the respective optical filters 58 and the repeated image. A sharp signal, illustrated in FIGURE 10, is provided when a match is identified.

In the embodiment being disclosed and as illustrated in FIGURE 2, the dictionary 58 forms a member which is external to the image tube 56. In the embodiment depicted in FIGURE 12, a dictionary 157 is included as part of an image tube 156. The various components in FIGURE 12 have been given reference designations which are similar to corresponding components in FIGURE 2 with the addition of 100. The components in FIGURE 12 may be substituted for the corresponding components in FIGURE 2. The image tube 156 in FIGURE 12, accordingly, corresponds with the image tube 56 in FIGURE 2. The image tube 156 is functionally similar to an electron microscope with the dictionary 157 functioning as the sample which is being examined. The dictionary 157 does not include optical filters but includes electron filters 158 which are transparent or opaque to electrons. The electrons are provided successively in predetermined scanning patterns across the electron filters 158 with the beam being modulated by the repeated input digital signals. The electrons through the optical dictionary 157 which indicate the matches impinge upon a phosphor plate 159 which is also included as part of the image tube 156.

Figure 12:
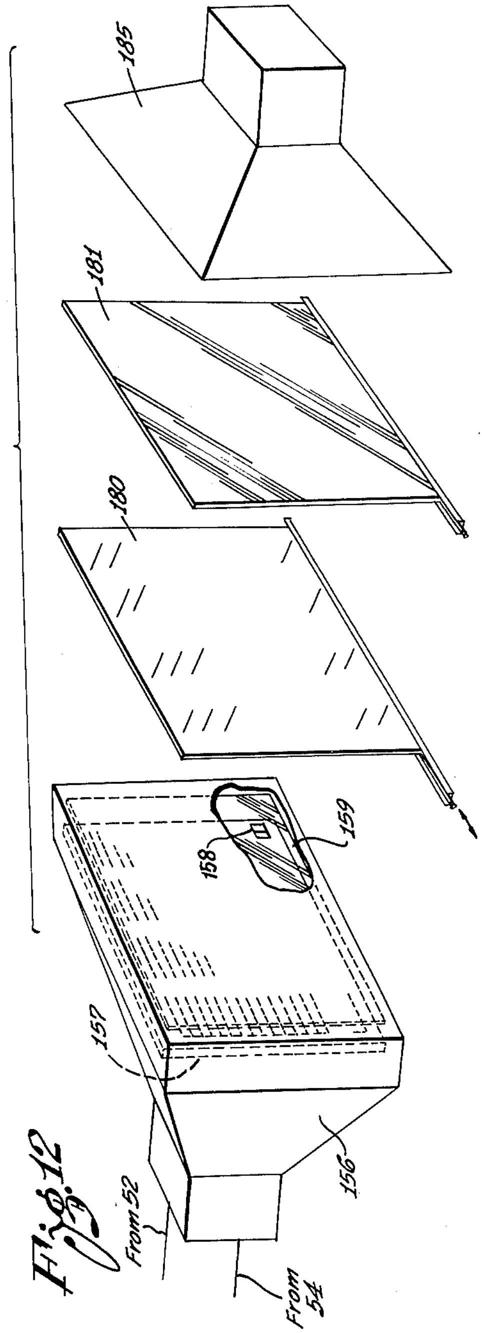
FIGURE 12 is a pictorial view illustrating a portion of a second embodiment of this invention utilizing a combined image tube and dictionary.

The scanning beam need not be a line beam but may cover an area of the dictionary 157 or a number of beams may simultaneously be provided each similarly modulated by the repeated signals to the tube 156. The image tube 156 provides for multiple images on the phosphor plate 159 so that it functionally corresponds to the image tube 56, the phosphor plate 59 and the optical dictionary 57 in FIGURE 2 except that the dictionary 158 does not move with respect to the phosphor plate 159. The rest of the components depicted in FIGURE 12 are quite similar to their corresponding components in FIGURE 2. A scanning member 180, a phosphor memory member 181 and a camera 185 are utilized to successively provide television signals representing the duplicate images provided by the image tube 156.

As indicated above, either the embodiment of the image tube 56 in FIGURE 2 or 156 in FIGURE 12 may be utilized in the specific illustrative embodiment of the data converter of this invention.

The successive video signals from the camera 85 in FIGURE 2 or 185 in FIGURE 12 are provided to a differentiating circuit 88 which produces pulses having magnitudes related to the sharpness of the signal from the vidicon camera. The peaked response permits axis ready detection even in the presence of considerable noise. The differentiating signals are clipped by a negative clipper 90 in decoding apparatus 114 and the positive pulses are introduced through a two-state switch 100 to one of two memory members 101 and 102. The memory members 101 and 102 are part of the decoding apparatus 114 for detecting the largest magnitude differentiated pulse from the circuit 80 so that the identity of the filter 58 providing for the best optical match is determined.

Assume that the switch 100 is initially set to couple the pulse from the clipper 90 to the memory 101. The magnitude of the signal in the memory 101 is compared with the signal in the memory 102 by a comparator 103. Depending upon which one of the registered signals is greatest, the comparator 103 provides a control potential at its terminal 1 or its terminal 2. Assuming that this is the first pulse provided from the negative clipper 90, the magnitude in the signal 101 is larger so that a control potential is provided at the output terminal 1 of the comparator 103. The output potential functions to reset the memory 102 and to operate the two state switch 100 so that the next pulse is coupled to the memory 102. The comparator 103 also provides a control potential to an address counter and memory 105 which keeps track of the position of the vidicon scan beam 85. In other words, the address counter and memory 105 keep track of the identity of the optical filter 58 for which the signals are being analyzed.

The control potential from the comparator 103 does not halt the counting portion of the address counter and memory 105, however, it operates the memory portion of the address counter and memory 105 to register the identity of the first optical filter 58. The memory maintains this registration until a pulse is provided from the negative clipper 90 which has a magnitude greater than that of the magnitude registered in the memory 101. Until that time, the succeeding pulses continue to be provided to the memory 102 which is automatically reset after each pulse by the comparator 103.

When a greater magnitude pulse is provided to the memory 102, the comparator 103 now provides a control potential at its output terminal 2 instead of at its output terminal 1. The memory 101 is now reset, the switch 100 is set to couple the next pulse to its output terminal 1 and a control potential is provided to the input lead 2 of the address counter and memory 105. When the control potential appears on the input terminal 2, instead of the input terminal 1, the registration in the memory of the address counter and memory 105 is changed to identify the optical filter 58 providing the signal being analyzed. In this manner, the address counter and memory circuit 105 continue to indicate the identity of the optical filter providing for the largest magnitude pulse from the clipper 90.

In the event that the magnitude of the pulses developed from two different optical filters 58 is substantially the same, the comparator 103 operates a logic circuit 110 for selecting one of these two signals. Depending upon particular instructions included in the logic 110, one of the two equal magnitude pulses are selected and an output potential is provided on a corresponding one of the output terminals 1 and 2. At the end of the scanning sequence of the vidicon camera 85, the focusing and scanning control 87 operates a read-out address circuit 111 which reads out the digital signals representing the identity of the selected optical filter 58. The output signals may be binary digital signals with the counter, not shown, in the address counter and memory 105 being a binary counter. The counter and memory 105 is automatically reset when the character address is read out. The signal from the control 87 also resets both memories 101 and 102 to return the equipment shown in FIGURE 3 to normal.

The output signal from the read-out address circuit 111 is provided through a normally enabled gate 113 to data processing equipment, not shown. The gate 113 is controlled by a space recognizing circuit 29 in FIGURE 1. Depending upon the particular code conversion, a space in the printed input information may be recognized either by providing an optical filter in the dictionary 57 or by utilizing the space recognizer 29. When the space recognizer 29 is utilized, it detects the absence of television signal variations during one character scan and provides an operating pulse through a delay circuit 121 to set a flip-flop circuit 122. The flip-flop circuit 122 disables the gate 113 so that output signals are not provided from the decoding apparatus 114 when a space is detected. The delay circuit 121 provides for a delay equivalent to the operating time of the recognizing equipment shown in FIGURE 2 so that the flip-flop circuit 122 is set during the decoding of the signals which operate the space recognizing circuit 29.

The flip-flop circuit 122 also operates a space address circuit 115 which provides an output signal indicating that a space has been detected. The flip-flop circuit 122 is reset by the focusing and scanning control 87 at the same time that the decoding apparatus 114 is reset.

In the embodiment described above, output signals are provided for each operation of the code converter 20. In the embodiment of the invention depicted in FIGURE 13, the signals provided to the decoding apparatus 214 are monitored and in the event signals exceding a particular threshold magnitude are not provided, the scanning and code converting operations are adjusted and as adjusted repeated for the character scan. In other words, if the normal scanning and code conversion operations do not function to provide for a minimum threshold signal to the decoding apparatus 214, these operations are adjusted or changed and the character scan is repeated.

Figure 13:
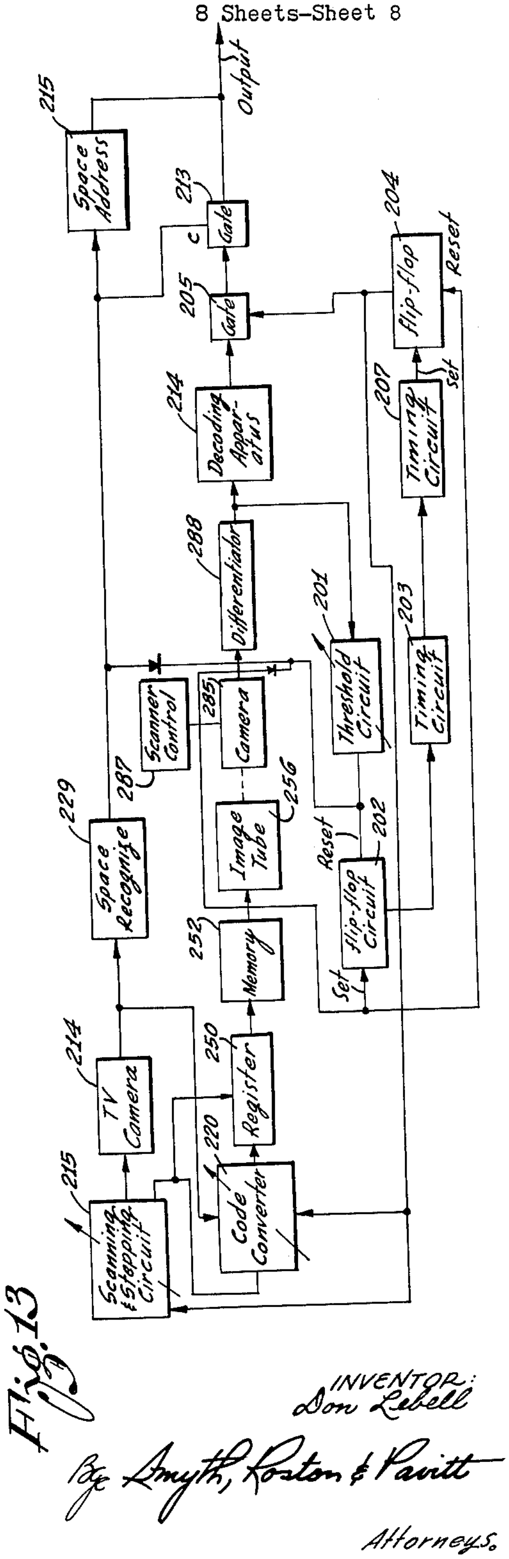
FIGURE 13 is a functional representation of another embodiment of the data converter of this invention.

The various components depicted in FIGURE 13 have been given reference designations similar to those in FIGURES 1 through 3 with the addition of 200. The camera 214 in FIGURE 13, for example, corresponds to the camera 14 in FIGURE 1. The camera 214 is controlled by a combination scanning and stepping circuit 215 to provide the video signals to an adjustable code converter 220. The signals from the converter 220 are provided to a register 250 and, under control of the circuit 215, are introduced to the repeater memory 252. The particular pattern is recognized by apparatus including the image tube 256 and the television camera 285. The details of the pattern recognition equipment, which is shown in FIGURE 2, are not repeated in FIGURE 13. The video signals from the camera 285 are differentiated by a circuit 208 and the differentiated signals are introduced to the decoding apparatus 214.

The differentiated signals from the circuit 288 are also introduced to an adjustable threshold circuit 201 which provides a control potential only if a signal introduced thereto exceeds a predetermined magnitude. The control potential from the circuit 201 functions to reset a flip-flop circuit 202. The flip-flop circuit 202 is set at the beginning of each character scan by the scanning and control circuit 287 which controls the operation of the camera 285. The flip-flop circuit 202 is cyclically set and reset during each character scan by the circuit 287. If a control potential is provided during the character scan, it resets the circuit 202 before the end of the character scan.

The flip-flop circuit 202 controls a timing circuit 203 which provides an increasing potential to a threshold circuit 207. The threshold circuit 207 triggers to set a flip-flop circuit 204 when the magnitude of the potentials provided thereto from the timing circuit 203 exceeds a predetermined value. When the flip-flop circuit 204 is set, it disables a gate 205 which is serially coupled between the decoding apparatus 214 and the gate 213. With the gate 205 disabled, an output address is not provided to the data processing equipment, not shown. The flip-flop circuit 204 is reset at the beginning of the next character scan by the scan control circuit 287.

The gate 213 is normally enabled and is disabled by the space recognizing circuit 229 which also functions to reset the flip-flop circuit 202 if a space is detected.

The flip-flop circuit 204 is in this manner set only if an insufficient match is provided between dictionary and the repeated image. When the flip-flop circuit 204 is set, it, in this manner, functions to disable the output of the decoding apparatus 214. The flip-flop circuit 204 also functions to adjust the scanning and stepping circuit 215 and the code converted 220 to repeat the character scan. The scanning sequence and the code conversion operation may be changed to provide for a greater definition of the input pattern. The circuit 215 and the converter 220 are changed together so that a similar coded output from the converter 220 is provided for the same input pattern even though the scanning and conversion is different. For example, if the scanning pattern now includes 20 scanning lines instead of 6, the code converter is adjusted for an input of 20 scanning lines but the output would be the same coded signal as if the input was 6 scanned lines for the same input pattern. The optical dictionary, accordingly, would correctly recognize the coded signals.

In this manner, if an insufficient match is detached, the scanning and code converting operations are reprogrammed. The reprogramming operation in the event of an insufficient match may readily be incorporated in the embodiment of the invention shown in FIGURES 1, 2 and 3. Because, however, of the delays provided for size recognition, the insufficient match for one character would be detected a number of character scans later. The circuit 15 would then accordingly be adjusted to repeat a number of character scans instead of just one, and the output would be blocked for the repeated scans.

Although this invention has been disclosed and illustrated with reference to particular applications, the principles involved are susceptible of numerous other applications which will be apparent to persons skilled in the art as somewhat indicated above. As a further example, the vidicon camera 85 may scan the phosphor memory in a focused beam pattern utilizing associated timing and integrating circuitry to generate signals representing the varying light intensities instead of using a wide beam. The invention is, therefore, to be limited only as indicated by the scope of the appended claims.

What is claimed is:

1. A data converter for converting input signals representing input patterns having two-dimensional variations with time to digital signals, including, means for converting the input signals to digital signals occurring in a particular pattern representing particular characteristics of the input patterns, means coupled to the converting means for repeating the digital signals for a number of times and for simultaneously providing indications of the repeated digital signals, a matching arrangement having a number of matching components for receiving the indications from the repeating means and for providing different signals occurring in particular patterns representing the different matches between the matching components and the indications from the repeating means, means coupled to said matching arrangement for simultantously cross-correlating the particular pattern of the digital signals to determine which matching component provides for the best match, and means coupled to said cross-correlating means for providing digital signals representing the determined matching component.

2. A data converter for reading printed text, including,
means for scanning a character of the printed text and for producing a plurality of electrical signals representing the scanned character,
means electrically coupled to the scanning means for producing visual images of the plurality of electrical signals representing the scanned character, and
scanning means including different groups of optical filters disposed in patterns representing the different characters for scanning the visual images and for determining which of the different groups of optical filters representing the scanned characters most closely approximate the plurality of signals representing the scanned characters.

3. In a reading apparatus, means for producing a plurality of video signals digitally representing the characteristics of a character to be read, line scanning means for providing a visual image under control of the video signals from said producing means, a plurality of different optical filters together forming a dictionary for identifying the different characters to be read, the filters being disposed in groups with each group representing a different character to be read, means for introducing the visible image from said line scanning means to each of the different optical filters, and means optically coupled to the optical filters for identifying the group of optical filters which have optical characteristics most closely matching the optical characteristics of the visual image from the line scanning means.

4. A data converter, including, means for providing a plurality of signals digitally representing any particular one of a number of two-dimensional patterns, including means for providing visual indications of the signals representing the particular two-dimensional pattern, a plurality of different optical filters each representing a different one of the two-dimensional patterns and disposed to receive the visual indications of the signals, and means for scanning the optical filters to cross-correlate the filters relative to the visual indications of the signals to identify the filter associated with the pattern represented by the signals.

5. A character recognition apparatus for the identification of symbols, including, scanning means for generating a pattern of electrical signals for each symbol scanned, means coupled to said scanning means for repeating the pattern of electrical signals for a number of times and for simultaneously providing indications of the repeated patterns, a dictionary including a number of different matching pattern devices, one for each symbol to be recognized, and means operatively coupled to the scanning means and the dictionary for determining which one of said devices best matches the indications of the repeated patterns.

6. A character recognition apparatus for the identification of symbols including scanning means for generating a pattern of electrical signals digitally identifying each symbol scanned, means coupled to said scanning means for providing indications of the pattern of electrical signals, a dictionary including a number of different matching pattern devices, one for each symbol to be recognized, phase shifting means for shifting the relative positions of the dictionary and the indications of the pattern of electrical signals, and means operatively coupled to the dictionary and to the indications of the pattern of electrical signals for determining which one of said devices best matches the indications of the pattern of the electrical signals.

7. In a reading apparatus, means for producing video signals representing the characteristics of a character to be read, line scanning means for providing a plurality of similar visible images under control of the video signals from said producing means, a plurality of different optical filters individually identifying the different characters to be read and together forming a dictionary for identifying the characters to be read, means including a phosphor memory member for simultaneously introducing a number of similar images from said line scanning means to said different optical filters, means for scanning different portions of each of said optical filters during slightly different time intervals, means coupled to said optical filters for moving said optical filters adjacent said line scanning means during the operation of said second-mentioned scanning means to adjust the alignment of the optical filters with the line scanning means over the range of the movement of said optical filters, and means coupled to said second-mentioned scanning means for identifying the one of said optical filters which most closely matches the characteristic of the similar visible images during the movement of said optical filters adjacent said line scanning means.

8. In a reading apparatus in accordance with claim 7 wherein said second-mentioned scanning means includes a scanning member defining a plurality of scan slits oriented at a slant to the direction of movement of said optical filters.

9. A data converter, including, an image tube for providing visual images of data to be converted, a movable optical dictionary positioned adjacent said image tube and including a number of different optical filters each having different optical characteristics for identifying individual data to be converted, means responsive to the visual images for simultaneously introducing the visual images to the different optical filters of the movable optical dictionary, means operatively coupled to the optical filters for simultaneously scanning the optical filters to determine which optical filter has optical characteristics most closely matching the characteristic of the duplicate visible images, and means coupled to said optical dictionary and to said scanning means for moving the dictionary relative to said image tube during the operation of said scanning means to facilitate the match between the optical filters and the image tube.

10. A character recognition apparatus for the identification of symbols including scanning means for generating a pattern of electrical signals for each symbol scanned, means coupled to said scanning means for repeating the pattern of electrical signals for a number of times and for simultaneously providing indications of the repeated patterns, a dictionary including a number of different matching pattern devices, one for each symbol to be recognized, and means for determining which one of said devices best matches the indications of the repeated patterns, including multiple scanning means for cross-correlating the patterns by scanning each of said pattern devices a number of times during different overlapping scanning intervals to derive electrical signals having waveshapes indicative of the match between the devices and the indications.

11. A data converter for converting visible information to electrical signals representing the visble information, including, means for scanning the visible information to develop electrical signals representing the visible information, means for duplicating the electrical signals a number of times and for simultaneously developing a number of duplicate images in accordance with the electrical signals, an array of filters optically coupled to said duplicating means for receiving the duplicate images, means synchronized with said duplicating means for simultaneously scanning the optical filters of the array whereby the light transmitted through each of the filters of the array is determined jointly by the characteristic of the filter and by the duplicate image.

12. A data converter in accordance with claim 11 wherein said duplicating means includes an image tube, means for repeatedly providing the electrical signal to said tube during one scanning frame of said tube, and a phosphor memory for retaining the successively provided images on the face of the image tube to simultaneously provide the duplicate image to the simultaneous scanning means.

13. A data converter in accordance with claim 11 wherein the simultaneously scanning means includes a movable scanning member defining a number of scan slits, one for each of the optical filters of the array.

14. A data converter for converting visible information to electrical signals representing the visible information, including, means for scanning the visible information to develop electrical signals representing the visible information, means for duplicating the electrical signals a number of times and for simultaneously developing a number of duplicate images in accordance with the electrical signals, an array of optical filters, each for receiving a number of duplicate images, means synchronized with said duplicating means for simultaneously scanning the optical filters of the array whereby the light transmitted through each of the filters of the array is determined jointly by the characteristic of the filter and by the duplicate image, and scanning means for simultaneously scanning including a movable scanning member defining a number of scan slits, one for each of the optical filters of the array, and means synchronized with said duplicating means for synchronously moving said array and said scanning member but at different speeds so as to correlate the filters of the array with the duplicate images.

15. A character recognition apparatus for the identification of symbols including scanning means for generating a pattern of electrical signals for each symbol scanned, means coupled to said scanning means for repeating the pattern of electrical signals for a number of times and for simultaneously providing indications of the repeated patterns, a dictionary including a number of different matching pattern devices, one for each symbol to be recognized, means for determining which one of said devices best matches the indications of the repeated patterns, threshold responsive means coupled to said determining means for recognizing when none of said devices substantially matches the repeated patterns, and means controlled by said threshold responsive means for adjusting said scanning means to reprogram the scanning of a symbol.

16. In a reading apparatus, means for producing video signals representing the characteristics of a character to be read, line scanning means for providing a plurality of similar visible images under control of the video signals from said producing means, a plurality of different optical filters together forming a dictionary for identifying the characters to be read, means for introducing a number of the similar visible images from said line scanning means to different portions of each of said different optical filters, means for scanning the different portions of each of said optical filters during slightly different time intervals, means coupled to said optical filters for moving said optical filters adjacent said line scanning means during the operation of said second-mentioned scanning means to adjust the alignment of the optical filters with the line scanning means over the range of the movement of said optical filters, and means coupled to said second-mentioned scanning means for identifying the one of said optical filters which most closely matches the characteristic of the similar visible images during the movement of said optical filters adjacent said line scanning means.

17. In a reading apparatus in accordance with claim 16 wherein said second mentioned scanning means includes a movable scanning member defining a plurality of scan slits, one for each of the optical filters, and means for moving said scanning member at a different speed than the speed of movement of said optical filters.

18. In a reading apparatus in accordance with claim 17 wherein the scan slits defined by said scanning member and slanted at an angle from the direction of motion of said scanning member.

19. A data converter for reading printed text, including, means for scanning a character of the printed text and for producing electrical signals representing the scanned character, means electrically coupled to the scanning means for producing a number of similar visible images of the electrical signals representing the scanned character, and scanning means including different optical filters for scanning the visible images and for determining which of the optical filters transmits the most illumination from the similar visible images, said scanning means including means for multiple scanning each of the optical filters to derive a peaked signal for the optical filter transmitting the most light which signal is readily detectable even in the presence of considerable noise.

20. A data converter for reading printed text, including, means for scanning a character of the printed text and for producing electrical signals representing the scanned character, means electrically coupled to said scanning means for cylically repeating the electrical signals produced by said scanning means, an image tube coupled to said repeating means for receiving the repeated electrical signals and including an electron dictionary having a number of different electron filters, and a phosphor plate for receiving the electrons through said filters of said dictionary to simultaneously provide images in accordance with the match between the repeated signals and the different electron filters of said dictionary, and means optically coupled to said phosphor plate of said image tube for scanning the images thereon to determine which electron filter best matches the repeated signals.

21. A character recognition apparatus for the identification of symbols, including, scanning means for generating an individual pattern of electrical signals for each symbol scanned, indicating means coupled to the scanning means for providing indications representative of the individual pattern of the electrical signals, a dictionary including a number of different matching pattern devices each representative of a different symbol to be recognized, comparing means operatively coupled to the indicating means and the dictionary for comparing the indications with the pattern devices in the dictionary to determine which one of the pattern devices best matches the indications, threshold responsive means coupled to said comparing means for providing an indication representing a lack of the indications and the pattern devices, and means controlled by the threshold responsive means for adjusting the scanning means relative to the dictionary upon the occurrence of an indication from the threshold responsive means to provide for further tests of matches between the indications and the pattern devices.

22. A character recognition apparatus for the identification of symbols, including: scanning means for generating an individual pattern of electrical signals for each symbol being scanned, a dictionary including a number of matching devices each having an individual pattern of characteristics representative of a different symbol to be recognized, comparing means responsive to the individual pattern of the electrical signals and to the pattern of the matching devices in the dictionary for comparing the characteristics of the signals and the matching devices to produce control signals in accordance with such comparisons, means operatively coupled to the scanning means and the dictionary for adjusting the scanning means relative to the dictionary to provide progressive comparisons by the comparing means, and means responsive to the control signals from the comparing means for providing output signals identifying the symbol upon the occurrence of particular characteristics in the control signals.

23. A character recognition apparatus for the identification of symbols, including: means for scanning each symbol in a first direction at progressive positions in a second direction transverse to the first direction, first means operatively coupled to the scanning means for providing for each scan a plurality of signals digitally representing the number of intersections between the symbol and the scanning means in each scan, second means operatively coupled to the scanning means for comparing the relative times at which particular intersections between the symbol and the scanning means occur in each scan, to produce signals digitally representing the results of such comparison for each scan, and means responsive to the signals produced by the first and second means in each scan for providing an identification of the symbol being scanned.

24. A character recognition apparatus for the identification of symbols, including, means for scanning each symbol in a particular pattern, generating means coupled to the scanning means for producing signals in accordance with the characteristics of the symbol being scanned, a dictionary including a number of different matching pattern devices each representative of a different symbol to be recognized, comparing means operatively coupled to the generating means and the dictionary for comparing the characteristics of the signals from the generating means with each of the pattern devices in the dictionary to obtain a determination as to an optimum correlation between the characteristics of the signals and an individual one of the pattern devices, and means responsive to the signals from the comparing means for identifying the particular symbol being scanned only in accordance with a particular optimum correlation between the characteristics of the signals and the pattern in the individual one of the pattern devices.

25. The apparatus set forth in claim 24, including: means for obtaining an adjustment of the scanning means relative to the dictionary to facilitate the determination as to the particular optimum correlation between the characteristics of the signals and the individual one of the pattern devices.

References Cited by the Examiner

UNITED STATES PATENTS

| | | | |
|---|---|---|---|
| 2,615,992 | 10/1952 | Flory et al. | 340—149.1 |
| 2,838,602 | 6/1958 | Sprick | 340—149.1 |
| 2,928,074 | 3/1960 | Sutter | 340—149.1 |
| 2,933,246 | 4/1960 | Rabinow | 340—149.1 |
| 3,011,152 | 11/1961 | Eckdahl | 340—149.1 |

OTHER REFERENCES

Wireless World, April 1957, pp. 173–75 (publication section of volume), "Reading by Electronics."

DARYL W. COOK, *Acting Primary Examiner.*

MALCOLM A. MORRISON, NEIL C. READ, EVERETT R. REYNOLDS, *Examiners.*